US009497957B2

(12) United States Patent
Relf et al.

(10) Patent No.: US 9,497,957 B2
(45) Date of Patent: Nov. 22, 2016

(54) ANIMAL TRAP

(71) Applicant: Beagle Products Limited, Yeovil, Somerset (GB)

(72) Inventors: David H. Relf, Yeovil (GB); George Savell, Yeovil (GB)

(73) Assignee: BEAGLE PRODUCTS LIMITED, Yeovil Somerset (GB)

( * ) Notice: Subject to any disclaimer, the term of this patent is extended or adjusted under 35 U.S.C. 154(b) by 0 days.

(21) Appl. No.: 14/440,201

(22) PCT Filed: Nov. 1, 2013

(86) PCT No.: PCT/GB2013/052860
§ 371 (c)(1),
(2) Date: May 1, 2015

(87) PCT Pub. No.: WO2014/083308
PCT Pub. Date: Jun. 5, 2014

(65) Prior Publication Data
US 2015/0272108 A1    Oct. 1, 2015

(30) Foreign Application Priority Data

Nov. 1, 2012 (GB) .................................. 1219668.9

(51) Int. Cl.
*A01M 23/30* (2006.01)
*A01M 23/34* (2006.01)

(52) U.S. Cl.
CPC ............. *A01M 23/30* (2013.01); *A01M 23/34* (2013.01)

(58) Field of Classification Search
CPC .............................. A01M 23/30; A01M 23/34
See application file for complete search history.

(56) References Cited

U.S. PATENT DOCUMENTS 225,144 A * 3/1880 Kisinger ............... A01M 23/24
   43/86
1,344,807 A * 6/1920 Maron ................. A01M 23/34
   43/86

(Continued)

FOREIGN PATENT DOCUMENTS

DE        877229 C        5/1953

OTHER PUBLICATIONS

Schlichting, N. International Search Report for PCT/GB2013/052860, Mar. 17, 2014.

*Primary Examiner* — Gary Hoge
(74) *Attorney, Agent, or Firm* — PatentBest; Andrew McAleavey

(57) ABSTRACT

An animal trap has a housing (2) and a support (12) extending within the housing. The support is movable between a first, set position and a second, fired position. A trigger (6) is integrally formed with the support (12) and protrudes from the bottom of the housing in the set position. Wire loops (4), which act to kill an animal, are fixed to the bottom of the support (12) and also protrude downwardly. In the set position of the trap, shoulders (18) on the trigger (6) are engaged beneath flanges (20) formed on the bottom of the housing. These shoulders (18) and flanges (20) form interengaging means to hold the trigger (6) and the support (12) in the downwardly extending set position against the force of two torsion springs (22) which are each affixed to the bottom of the support (12) and to the housing (2). The trigger (6) can be moved by an animal due to its flexibility. This causes the interengaging means to become unengaged and the support (12) to move explosively to its upper fired position. The movement of the support explosively lifts the wire loops (4) whereby an animal within a loop is squashed against the bottom of the housing.

23 Claims, 3 Drawing Sheets

(56) References Cited

U.S. PATENT DOCUMENTS

| | | | | |
|---|---|---|---|---|
| 1,701,261 A | * | 2/1929 | Fox | A01M 23/34 43/86 |
| 1,918,582 A | * | 7/1933 | Alvau | A01M 23/34 43/80 |
| 2,099,021 A | * | 11/1937 | Landes | A01M 23/30 43/81 |
| 2,348,002 A | * | 5/1944 | Glass | A01M 23/34 43/86 |
| 2,475,467 A | * | 7/1949 | Alvan | A01M 23/34 43/80 |
| 5,692,336 A | * | 12/1997 | Fiore, Jr. | A01M 23/34 43/85 |
| 5,746,020 A | * | 5/1998 | Fiore, Jr. | A01M 23/34 43/85 |
| 2004/0216365 A1 | * | 11/2004 | Hill | A01M 23/30 43/81 |
| 2007/0068065 A1 | | 3/2007 | Brown, Jr. | |
| 2010/0031555 A1 | | 2/2010 | Laidier et al. | |

\* cited by examiner

ANIMAL TRAP

FIELD OF THE INVENTION

The present invention relates to an animal trap.

BACKGROUND

European patent 1894469 describes an animal trap which has a generally cylindrical housing which is arranged to be deployed in a substantially vertical position. Movable within the cylindrical housing is a closing part which is held against spring pressure in an upper position. When an animal pushes against a pivotable trigger mechanism extending in an opening at the base of the trap, the trap is triggered and the closing part is propelled downwardly where it can exert a lethal closing force on an animal in the opening.

This known trap has a number of disadvantages. First of all, the trigger mechanism hangs on surfaces of the closing part and there can be difficulties in setting the trap unless it is arranged accurately vertical so that the trigger mechanism hangs, under gravity, in the vertical position. Furthermore, this known trap has to be fixed so that it extends into a tunnel, which restricts its usefulness. The trap is also made of a number of interengaging separate pieces. This means that it is expensive to manufacture and to assemble and is not always reliable in operation.

SUMMARY OF THE INVENTION

The present invention seeks to provide an animal trap, capable of killing an animal, which improves on known traps.

According to the present invention there is provided an animal trap comprising a housing, a support within the housing, the support being movable between a first, set position and a second, fired position, biasing means biasing the support towards the second, fired position, and means to hold the support in the first set, position against the force of the biasing means, the animal trap further comprising at least one trap operating member carried by, and movable with, the support, wherein the means to hold the support in the first, set position comprise interengaging means arranged to be moved from their interengaged position by the movement of an elongate trigger which extends into a path for an animal, and wherein the trigger is carried by the housing or the support such that it can flex and thereby be moved in two opposed directions relative to the path for the animal.

Embodiments of an animal trap of the present invention have a much reduced number of parts as compared to the known trap so that the trap is cheaper and easier to manufacture and assemble.

Furthermore, as the trigger can flex in two opposed directions, the trap can be fired reliably by an animal moving along the path in either direction.

In an embodiment, the trigger is carried by the support, the trigger being fixed only at one of its ends to the support so that it can flex and move in both directions along the path for the animal.

The trigger and support can be fixed in any manner providing the required flexibility. For example, one or more springs, clips or elastic connectors may be employed.

In an embodiment, the trigger and the support are moulded in one piece from plastics material.

The flexible trigger which is fixed to the support is much easier to manufacture than the arrangement of the known trap and needs no assembly as, in a preferred embodiment, the support and the trigger are moulded in one piece from plastics material.

It has been found that the use of an elongate trigger which is effectively cantilevered to the support leads to reliable triggering of the animal trap every time and in any orientation.

In an alternative embodiment, the trigger is carried by the housing, the housing being connected to the trigger at an intermediate point along its length which defines a pivot point for the trigger.

The arrangement may be such that the trigger is arranged to move substantially perpendicularly relative to the length of the path for the animal. An animal, therefore, may lift the trigger as it moves along the path.

Alternatively, the trigger is arranged to flex and move in both directions along the path for the animal.

As previously, this enables the trap to be fired reliably as the animal moves along the path.

Preferably, the interengaging means are provided on the trigger and on one of the support or the housing.

In one embodiment, the interengaging means comprise one or more transverse shoulders formed on the elongate trigger which, in the first set position, are arranged to engage with corresponding flanges provided on the housing.

Alternatively, the interengaging means comprise one or more transverse shoulders formed on the elongate trigger member which, in the first, set position, are arranged to engage with corresponding flanges provided on the support.

The arrangement of the transverse shoulders and the flanges is such that in the set position, the support is prevented from moving under the force of the biasing means. However, a small movement of the trigger in a direction substantially perpendicularly to its length and substantially perpendicularly to the extent of the transverse shoulders, moves the interengaging means out of engagement so that the biasing means can move the support explosively towards the second, fired position.

The flexibility of the elongate trigger member can be altered, for example, by adjusting its thickness and cross-sectional shape as required. The point along its length at which the trigger is fixed to the support or the housing also alters the flexibility. The elongate trigger member needs sufficient rigidity to reliably keep the trap in its set position. On the other hand, when the end of the trigger is touched by an animal, the movement of the trigger needs to be sufficient to ensure that the interengaging means no longer engage.

To aid in giving the trigger member the required flexibility it is arranged that there is a separation distance between the shoulders which engage with the flanges and the point on the trigger which provides its pivot point or centre of rotation for the movement.

The biasing means can be any appropriate means. Generally, the biasing means will be one or more springs acting on the support and also connected to the interior of the housing.

In a currently preferred embodiment, the biasing means comprise two torsion springs arranged within the housing on opposite sides of the support, each torsion spring having a first end engaged with the housing, and a second end engaged with the corresponding side of the support.

For ease of construction, the housing comprises two moulded half-shells arranged to be fixed together.

In a preferred embodiment, the two half-shells, which are preferably moulded from plastics material, are substantially identical. This reduces costs in tooling and manufacturing.

In a preferred embodiment, where the biassing means comprise two torsion springs, each torsion spring comprises a length of wire formed into a coil and having a first end for engagement with the housing, and a second end for engagement with a side of the support. Preferably, the two torsion springs are arranged such that their first ends extend in opposite directions.

This arrangement of the torsion springs enables both of the springs to be engaged in the same half-shell of the housing during assembly with the second end of each torsion spring engaged with the support. The arrangement means that as well as the springs biassing the support away from the set position, they also bias the support in opposite directions in a plane extending perpendicularly to the longitudinal extent of the support and the trigger. In this way the assembly of the trap is made simple as the support and the torsion springs can be assembled in one half-shell only. Furthermore, the two springs act on the support in opposite directions in the plane transverse to its longitudinal extent and so are balanced.

In an embodiment, the support is formed with grooves on each side thereof, preferably proximate to one end, and the corresponding second end of a torsion spring is engaged in the respective groove.

Thus, assembly of the animal trap simply requires that the second end of each torsion spring is engaged into the receiving groove provided therefor in the support.

Additionally and/or alternatively means can be provided on the support to retain the second ends of the torsion springs.

It will be appreciated that, in use, if an animal encounters the trigger and moves it, the trap moves to its second, fired position with explosive force. Therefore, the trap, although it could be used to trap animals, is better used as a killing trap for small animals.

The trap can be set, and therefore used, in any orientation. In a preferred embodiment the trap is designed to be set with the housing arranged upright. When the support member is in its first, set position, the trigger extends downwardly, and protrudes downwardly of the support and of the housing. This orientation is particularly advantageous as it is easier to set the trap by pushing the support downwardly. However, as with the trap described in EP1894469, a trap of the invention could be arranged to work with the support raised upwardly in the set position so that it fires downwardly.

In either orientation, the base of the support can be arranged to carry one or more animal impacting members.

In an embodiment, two trap operating members are carried by the support. Each trap operating member comprises a length of wire bent to form a wire loop extending from the housing, the ends of each wire loop being engaged in the support.

In the first, set position, the trigger and the two wire loops protrude beyond a first end wall of the housing, for example, extend downwardly beyond the first end wall.

When the animal trap is triggered by pressure on the trigger, the support moves explosively through the housing moving the trigger and the two wire loops in the same direction. Generally this direction is upwardly. Where the trap has been triggered by an animal, the arrangement is such that the animal will be within one or more of the wire loops and squashed by the wire loop or loops between the wire loop and the first end wall of the housing.

Preferably, where the interengaging means comprise at least one flange on the housing, this flange extends from the first end wall of the housing.

The trap can be arranged to catch animals such as moles and voles which are generally found in tunnels. In that situation the housing will be positioned above a tunnel such that the trigger and the two wire loops extend into the tunnel in the set position of the trap.

For non-tunnelling animals, opposed walls of the housing can be extended, for example so that they effectively house the trigger and the wire loops, and the animal trap is then supported on the earth on the extended walls.

In an embodiment, the wire of each wire loop is corrugated along its bottom portion to grip the animal as the trap fires. The first end wall of the housing can be similarly corrugated.

In an alternative embodiment, the trap operating members may be doors carried by the support which close the ends of the path defined by the housing to retain the animal within the path when the trap is fired.

In an embodiment, the inside of the housing is provided with guide ribs or grooves to guide the movement of the support.

The provision of such guides help to keep the support in the appropriate positions during operation leading to reliability in setting the trap and reliability when the trap is fired.

Means such as paddles or other formations may also be provided to prevent the support being pushed too far during setting. This also aids reliability.

BRIEF DESCRIPTION OF THE DRAWING FIGURES

Embodiments of the present invention will hereinafter be described, by way of example, with reference to the accompanying drawings, in which.

DETAILED DESCRIPTION

Figure 1:
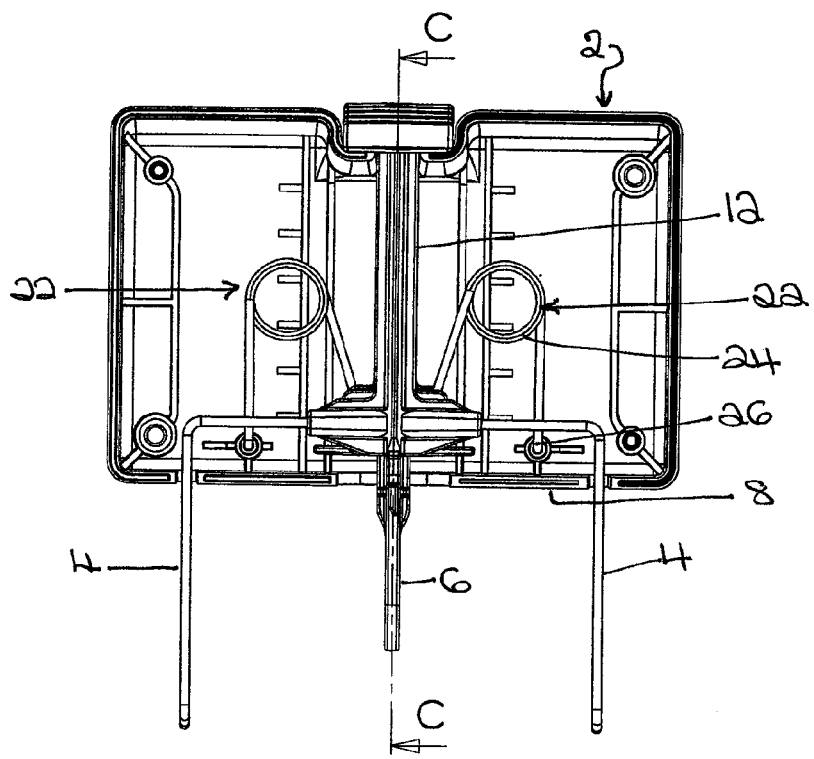
FIG. 1 shows a cross-section of an animal trap of the invention, the trap being shown in its set position.
Figure 2:
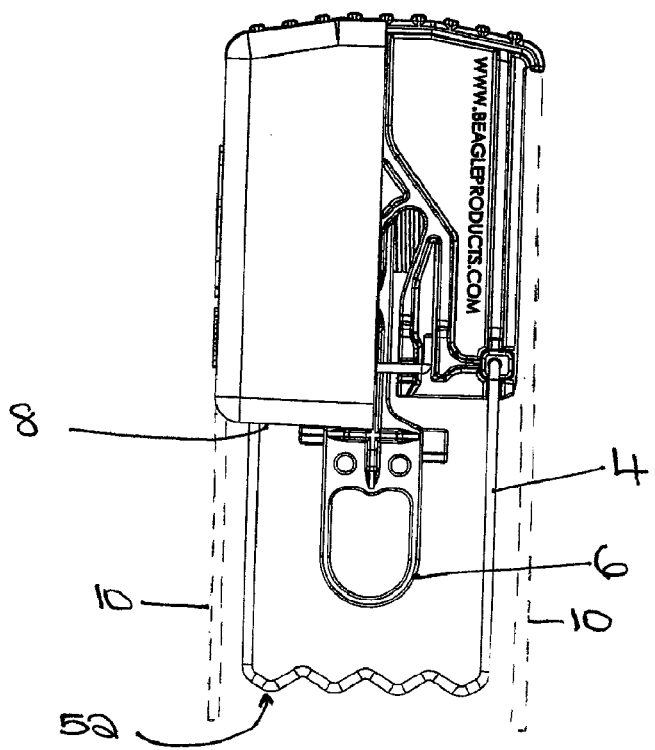
FIG. 2 shows an end view of the trap of FIG. 1, partly in section.

The animal trap shown in the drawings is particularly for use in trapping animals which move along tunnels such as moles and voles. In this respect, and as can be seen in FIGS. 1 and 2, the trap has a housing 2 from which there depends, in the set position, two wire loops 4 and a trigger 6. In use of this trap, the bottom end wall 8 of the housing is arranged above the tunnel so that the wire loops 4 and the trigger 6 extend into the tunnel. The tunnel provides a path, defined beneath the housing 2, through which the animal moves.

For killing animals which do not use tunnels, opposed walls of the housing 2 can be extended as indicated by dotted lines at 10 in FIG. 2. The housing can then be supported on the extended walls 10 to define a path, containing the wire loops 4 and the trigger 6, along which an animal may venture or may be attracted by bait.

Figure 5:
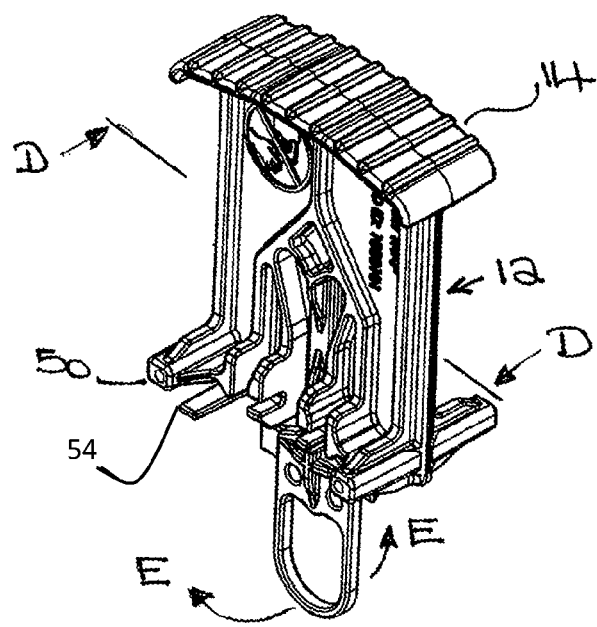
FIG. 5 shows a perspective view of a support and trigger of the trap of FIG. 1.

It will be seen that the housing 2 has a support 12 extending therethrough. The support 12 has its longitudinal extent as shown on FIG. 1 along the line C-C. As can be seen in FIG. 5, for example, the support 12 extends in a transverse plane D-D extending perpendicularly to the longitudinal extent C-C. The upper portion of the support 12 has a handle 14 which, and as illustrated, is gently curved as it extends along the transverse plane to facilitate handling.

Figure 6:
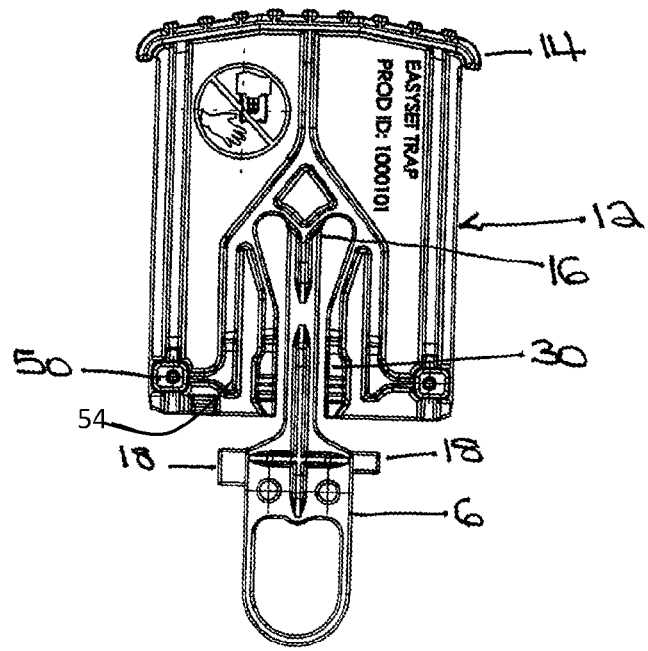
FIG. 6 shows a view from one side of the support and trigger of FIG. 5.

As is best seen in FIG. 6, the support 12 is moulded, from plastics material, in one piece to define the trigger 6. It will be seen that the trigger 6 is joined to the support 12 at its one inner end 16. There is no other connection between the trigger 6 and the support 12. The trigger 6, which extends longitudinally, is shaped so that it has some flexibility in the direction perpendicular to the plane D-D as indicated by the arrows E-E on FIG. 5. Thus, the trigger 6, on flexing, can move in both directions along the path for the animal.

The trigger 6 has two transverse shoulders 18 formed thereon. In the set position, each transverse shoulder 18 is engaged beneath a corresponding flange 20 which extends within the lower end wall 8 of the housing. Thus, the interengagement between the transverse shoulders 18 and the flanges 20 retains the trigger 6 in the set position illustrated in FIG. 1 against the force of two torsion springs 22.

Each of the torsion springs 22 is formed of a length of wire having a coil 24 and a first end 26 engaged with the housing. In this respect, the housing is formed with internal protuberances 28, which are visible in FIG. 4, and define a respective bore within which the first end 26 of each torsion spring can be engaged. The other, second, end 29 of each torsion spring engages within grooves 30 provided on each side of the lower end of the support 12. These grooves are apparent in FIG. 6.

Figure 4:
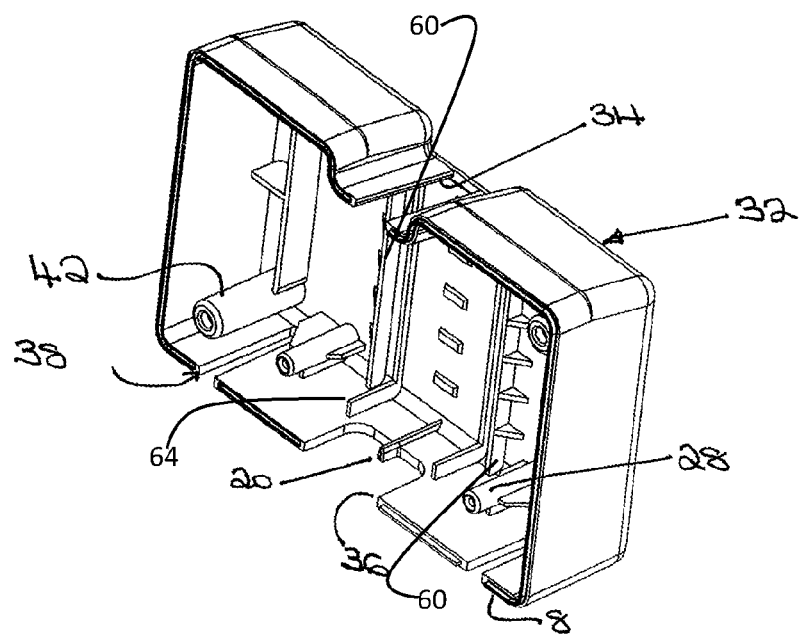
FIG. 4 shows a perspective view of one half-shell moulding used to form a housing of an animal trap as shown in FIG. 1.

The housing 2 of the animal trap is made by assembling two half-shells 32 as illustrated in FIG. 4. These half-shells 32 are preferably identical and each has an opening 34 formed in a top wall thereof through which the support 12 will extend and an opening 36 provided in a lower end wall 8 thereof through which the trigger 6 extends. There are also grooves 38 in the lower end wall 8 through which the wire loops 4 extend.

Figure 3:
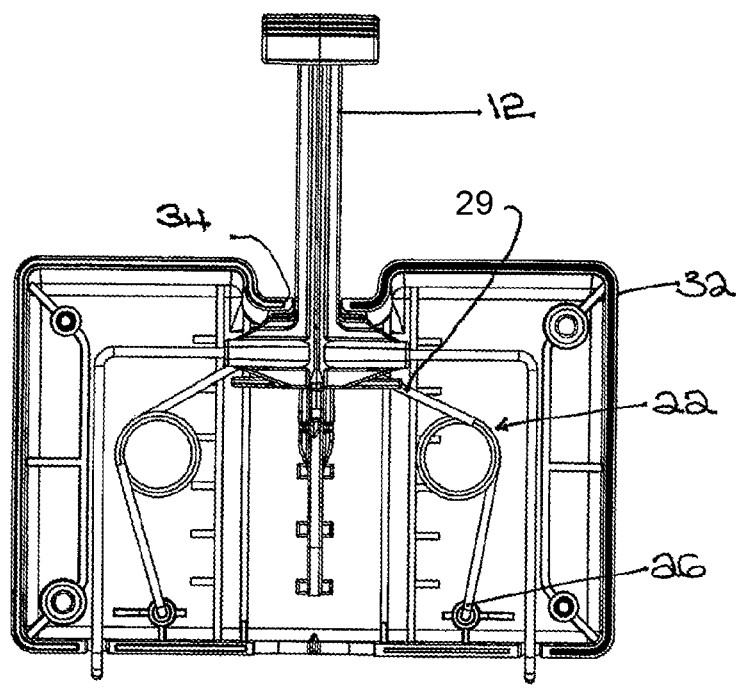
FIG. 3 shows a view similar to FIG. 1 but with the trap in its fired position.

The trap is assembled in the fired position which is illustrated in FIG. 3. The support 12 is positioned so that its longitudinal extent extends through the groove 34 in the top wall of one half-shell 32. The two torsion springs 22 are then placed in position. The first end 26 of each spring 22 is inserted in the bore of the respective protuberance 28 of the housing and the second end 29 of each spring 22 is extended through a respective groove 30 in the support 12. In this respect, the first ends 26 of the two torsion springs 22 extend in opposite directions. This means that whilst one spring 22 will, when engaged with the support 12, tend to pull the support out of the half-shell as viewed in FIG. 3, the other spring 22 will tend to pull the support 12 down into the half-shell. Put another way, the two torsion springs 22 bias the support 12 in opposite directions in a plane D-D extending perpendicularly to the longitudinal extent of the support 12. Thus, the support 12 is stably held within the half-shell.

As well as fastening the springs to the support 12, the two wire loops 4 are also affixed to opposite sides of the support 12. Each wire loop 4 extends through the respective groove 38 in the lower end wall 8 of the housing and the two ends of each wire loop are engaged in holes 50 therefor which are provided near the base of the support 12.

Once the support 12, the torsion springs 22, and the wire loops 4 have been assembled, relative to the one half-shell 32, a second half-shell 32 can then be mounted onto the first half-shell. The edges of the half-shells can be provided with appropriate interengagements. In addition, projections 42 with bores are provided internally of the half-shells for receiving screws so that the two halves can be screwed together.

When the second half-shell has been affixed to the first, the two openings 34 in the top wall of the completed housing 2 cooperate to form a groove through which the support 12 extends. Similarly the two openings 36 form a hole in the lower end wall 8 through which the trigger 6 will protrude once the trap has been set. The wire loops 4 will similarly protrude through the grooves 38.

Each half-shell 32 forming the housing 2 has two parallel guide ribs 60 extending along the height of the inside of the half-shell. During movement of the support 12 upwardly and downwardly through the housing, two opposed mouldings 52, provided near the base of the support 12, move along the guide ribs 60, and are guided thereby.

The support 12 also has flexible protuberances 54 near the base thereof. When the support 12 is moved to its set position, guided by the mouldings 52 and guide ribs 60, the protuberances 54 engage on mouldings 64 within the housing 2. If the support 12 is pushed too far, the protuberances 54 are flexed and urge the support 12 into its correct position.

The trap as illustrated is used in the position shown in FIG. 1 and is moved to this set position simply by pressing down on the handle 14 of the support 12 such that the trigger 6 extends through the bottom surface of the housing to depend therefrom. The trigger 6 and support 12 are held in this position by the engagement of the shoulders 18 of the trigger 6 underneath the flanges 20 of the lower end wall 8 of the housing.

It will be appreciated that the trap as shown in FIG. 1 is quite stable unless or until the trigger 6 is moved in the direction E-E. Such movement would occur if an animal were to walk towards the trigger 6 along the tunnel. When the animal touches the trigger 6, it flexes and this disengages the shoulders 18 from the flanges 20. Once this is done the support 12 moves explosively upwardly under the force of the torsion springs 22 and the trigger 6 and the wire loops 4 move similarly. The animal will have its body extending through one of the wire loops 4 which will therefore explosively squash the animal between the loop and the bottom of the housing and will generally kill the animal. As can be seen in FIG. 2, the bottom portion of each wire loop 4 is corrugated as indicated at 72. This enhances the grip of the wire loop 4 on the animal.

If required, it would also be possible to form teeth or other structures on the lower end wall 8 of the housing 2 to cooperate with the wire loops and enhance the killing effect.

One of the advantages of an animal trap as described and illustrated herein is that it is not affected in any way by gravity. This means that it can be set when oriented in any direction.

In the embodiment described above, the trigger is formed in one piece with the support. It is also possible for the trigger, alternatively, to be fixed to the housing. In this latter respect, the interengaging means would be between the trigger and the support, rather than between the trigger and housing as described above.

It is important that the trigger can flex in both directions along the path along which the animal will move. This is achieved by giving flexibility to the trigger and, as described above, can be done by having the trigger fixed at one of its ends to provide a cantilever construction.

It is alternatively possible for the support or the housing to be connected to the trigger at an intermediate point along its length to thereby define a pivot point for the trigger.

As an alternative to having the trigger formed in one piece with either the support or the housing it is possible to fix the trigger to the housing or the support by any appropriate means, for example by the use of one or more springs, clips or elastic connectors.

Instead of providing for flexing of the trigger such that it is moved along the path by movement of the animal it will also be possible to provide that the trigger can move upwardly and downwardly in the path so that it would be lifted by an animal moving along the path.

The trap is described herein with specific reference to a killing trap. The explosive nature of the triggering means that the trap is very suitable for this. However, instead of providing wire loops and other killing means as the trap operating members, it will alternatively be possible for the movement of the support to close doors at each end of the path for the animal whereby the animal is simply retained with the path.

Other modifications to, and variations in, the invention as described and illustrated may be made within the scope of the accompanying claims.

The invention claimed is:

1. An animal trap comprising:
    a housing,
    a support within the housing, the support being movable between a first, set position and a second, fired position, biasing means biasing the support towards the second, fired position, and
    means to hold the support in the first, set position against the force of the biasing means, the animal trap further comprising
    at least one trap operating member carried by, and movable with the support,
    wherein the means to hold the support in the first, set position comprise interengaging means arranged to be moved from their interengaged position by the movement of an elongate trigger which extends into a path for an animal, and
    wherein the trigger is carried by the support such that it can flex and thereby be moved in two opposed directions relative to the path for the animal.

2. An animal trap as claimed in claim 1, wherein the trigger is fixed only at one of its ends to the support so that it can flex and move in both directions along the path for the animal.

3. An animal trap as claimed in claim 1, wherein the trigger and the support are moulded in one piece from plastics material.

4. An animal trap as claimed in Claim 1, wherein the interengaging means are provided on the trigger and on the housing.

5. An animal trap as claimed in claim 1, wherein the interengaging means comprise one or more transverse shoulders formed on the elongate trigger member which, in the first, set position, are arranged to engage with corresponding flanges provided on the housing.

6. An animal trap as claimed in claim 1, wherein the biasing means comprise two torsion springs arranged within the housing on opposite sides of the support, each torsion spring having a first end engaged with the housing, and a second end engaged with the corresponding side of the support.

7. An animal trap as claimed in claim 1, wherein the housing comprises two moulded half-shells arranged to be fixed together, the two half-shells forming the housing being substantially identical.

8. An animal trap as claimed in claim 1, wherein the biasing means comprise two torsion springs arranged within the housing on opposite sides of the support, each torsion spring being a length of wire forming a coil and having a first end engaged with the housing, and a second end engaged with the corresponding side of the support, the two torsion springs being arranged such that their first ends extend in opposite directions.

9. An animal trap as claimed in claim 1, further comprising two trap operating members carried by the support, each trap operating member comprising a length of wire bent to form a wire loop extending from the housing, the ends of each wire loop being engaged in the support, and being arranged to impact an animal when the trap is fired.

10. An animal trap as claimed in claim 9, wherein in the first, set position the trigger and the two wire loops protrude beyond a first end wall of the housing.

11. An animal trap as claimed in claim 1, wherein the inside of the housing is provided with guide ribs or grooves to guide the movement of the support.

12. An animal trap comprising
    a housing,
    a support within the housing, the support being moveable between a first, set position and a second, fired position,
    biasing means biasing the support towards the second, fired position, and
    means to hold the support in the first, set position against the force of the biasing means, the animal trap further comprising
    at least one trap operating member carried by, and movable with, the support,
    wherein the means to hold the support in the first, set position comprise interengaging means arranged to be moved from their interengaged position by the movement of an elongate trigger which extends into a path for an animal, and
    wherein the trigger is carried by the support by being fixed only at one of its ends to the support such that it can flex and thereby be moved in two opposed directions relative to the path for the animal, and
    wherein the interengaging means comprise one or more transverse shoulders formed on the elongate trigger member which, in the first, set position, are arranged to engage with corresponding flanges provided on the housing.

13. An animal trap comprising:
    a housing,
    a support within the housing, the support being movable between a first, set position and a second, fired position,
    biasing means biasing the support towards the second, fired position, and
    means to hold the support in the first, set position against the force of the biasing means, the animal trap further comprising:
    at least one trap operating member carried by, and movable with, the support,
    wherein the means to hold the support in the first, set position comprise interengaging means arranged to be moved from their interengaged position by the movement of an elongate trigger which extends into a path for an animal, wherein the trigger is carried by the housing or the support such that it can flex and thereby be moved in two opposed directions relative to the path for the animal, and
    wherein the inside of the housing is provided with guide ribs or grooves to guide the movement of the support.

14. An animal trap as claimed in claim 13, wherein the trigger is carried by the support, the trigger being fixed only at one of its ends to the support so that it can flex and move in both directions along the path for the animal.

15. An animal trap as claimed in claim 14, wherein the trigger and the support are moulded in one piece from plastics material.

16. An animal trap as claimed in claim 13, wherein the interengaging means are provided on the trigger and on the housing.

17. An animal trap as claimed in claim 13, wherein the interengaging means comprise one or more transverse shoulders formed on the elongate trigger member which, in the first, set position, are arranged to engage with corresponding flanges provided on the housing.

18. An animal trap as claimed in claim 13, wherein the biasing means comprise two torsion springs arranged within the housing on opposite sides of the support, each torsion spring having a first end engaged with the housing, and a second end engaged with the corresponding side of the support.

19. An animal trap as claimed in claim 13, wherein the housing comprises two moulded half-shells arranged to be fixed together, the two half-shells forming the housing being substantially identical.

20. An animal trap as claimed in claim 13, wherein the biasing means comprise two torsion springs arranged within the housing on opposite sides of the support, each torsion spring being a length of wire forming a coil and having a first end engaged with the housing, and a second end engaged with the corresponding side of the support, the two torsion springs being arranged such that their first ends extend in opposite directions.

21. An animal trap as claimed in claim 13, further comprising two trap operating members carried by the support, each trap operating member comprising a length of wire bent to form a wire loop extending from the housing, the ends of each wire loop being engaged in the support, and being arranged to impact an animal when the trap is fired.

22. An animal trap as claimed in claim 21, wherein in the first, set position the trigger and the two wire loops protrude beyond a first end wall of the housing.

23. An animal trap, comprising:
a housing;
a support within the housing, the support being movable between a first, set position and a second, fired position;
one or more springs bearing between the housing and the support to bias the support towards the second, fired position;
at least one depending trap operating member carried by, and movable with, the support; and
a trigger carried by a lower end of the support such that it extends into a path for an animal defined by the animal trap, the trigger being constructed and arranged so that it can flex and move in two opposed directions along the path, the trigger and the housing having cooperating engaging structures that, when engaged, hold the support in the first, set position against the force of the one or more springs;
wherein movement of the trigger causes the cooperating engaging structures to disengage, thereby releasing the support to move toward the second, fired position under the force of the one or more springs.

* * * * *